June 7, 1932.  S. E. RAWLS  1,861,816

MOWING MACHINE

Filed Sept. 6, 1930

INVENTOR
Silas E. Rawls
BY
Stevens & Batchelor
ATTORNEYS.

Patented June 7, 1932

1,861,816

UNITED STATES PATENT OFFICE

SILAS E. RAWLS, OF STREATOR, ILLINOIS, ASSIGNOR TO RAWLS MANUFACTURING COMPANY, OF STREATOR, ILLINOIS, A CORPORATION OF ILLINOIS

MOWING MACHINE

Application filed September 6, 1930. Serial No. 480,255.

My invention relates to mowing machines, and more particularly to that type of machines which are hand-propelled and power-operated, and my main object is to provide a machine of this kind which is so balanced that a minimum of effort may be exerted to propel the same.

A further object of the invention is to so locate and distribute the vital units of the novel machine as to balance the same and lend it a high degree of stability.

A still further object of the invention is to locate the power element of the novel machine at a height for maximum air-cooling exposure, while disposing the gearing for the operation of the mower element at a low level in proximity to the latter.

Another object of the invention is to embody in the novel machine a frame of extreme simplicity and with extensions directed for the most efficient disposal of the vital units of the invention. A final, but nevertheless important, object of the invention is to design the novel machine along lines of maximum lightness consistent with durability, in order that the handling of the machine may require a minimum of manual effort and the use thereof may extend for long periods without other than ordinary attention.

With the above objects in view, and any others which may suggest themselves from the description and claims to follow, a better understanding of the invention may be gained by reference to the accompanying drawing, in which—

Figure 1:
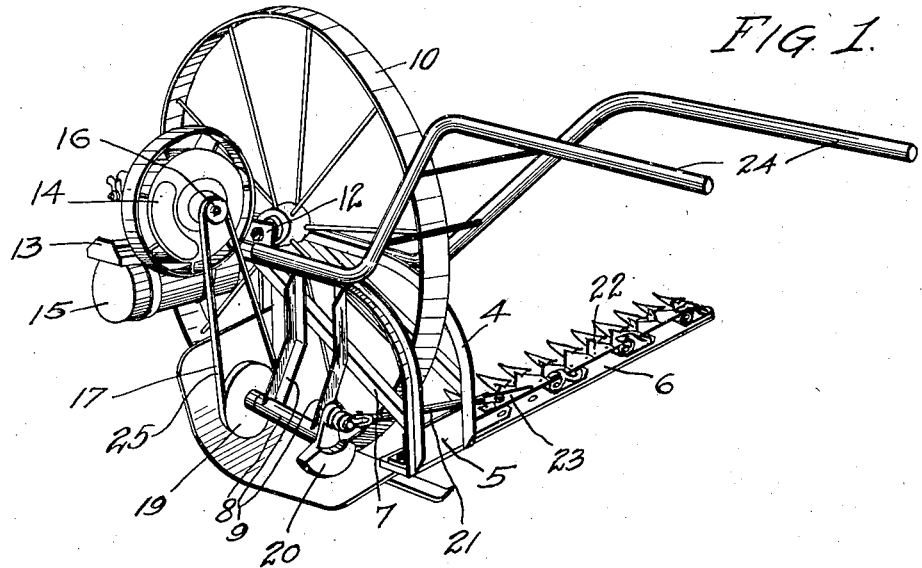
Figure 2:
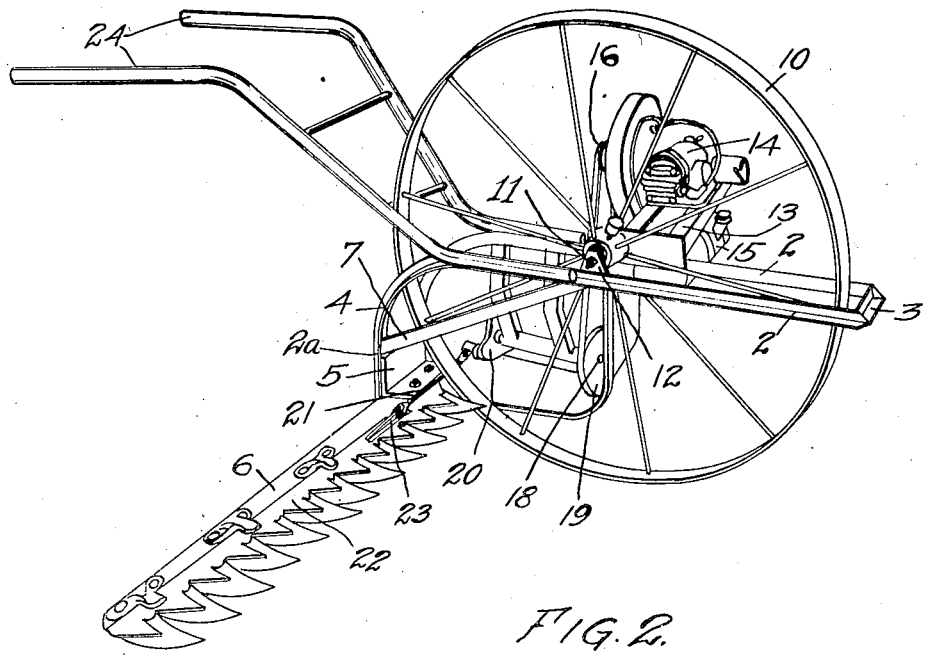

Figure 1 is a perspective view of the novel machine from the rear and showing one side thereof; and Figure 2 is a similar view from the front and showing the other side thereof.

Referring specifically to the drawing, the basic element of the novel mowing machine comprises a horizontal frame consisting of side angle bars 2 extending from front to rear and connected in front by a spacer 3. The frame bars 2 are spaced in parallel relation and curved downwardly at the rear, as indicated at 4 to terminate with vertical sections 2a. These sections receive preferably by welding on the forward side an angle plate 5, to the base of which is bolted a standard cutter bar 6, extending laterally of the frame. By disconnecting the bolts the cutter bar may be removed in order to enable the machine to be shipped in compact form. The frame bars 2 are braced in the region of their curved sections by strut bars 7 welded at the ends to the bars 2 and their rear sections 2a.

One of the frame bars 2 receives a hanger comprised of laterally spaced angle bars 8, the upper ends of these bars being welded to the frame bar 2 and the lower ends carrying a horizontal bearing tube 9. Between the frame bars 2 is disposed a traction wheel 10 which is freely journaled on a spindle 11, the latter being secured in bearing plates 12 welded inside the frame bars. One of these plates is enlarged laterally to receive a bracket structure 13, which is preferably welded to the plate and extends laterally from the frame to receive an air-cooled gasoline motor on the upper side and a fuel tank 15 on the lower side. On the rear side, the motor receives a pulley 16 from which a transmission belt 17 extends downwardly to a pulley 19. The latter is carried by a spindle which is journaled in the bearing tube 8 and receives at its rear end a counterbalanced pitman 20. The pitman 20 is provided with the customary pitman pin and bushing for imparting oscillating motion to a pitman rod 21, which extends to the head 23 of a sickle 22 mounted in the cutter bar 6. The frame bars 2 receive preferably by welding in their outwardly-facing hollows a pair of handles 24, which rest rearwardly to a suitable height for the manual control and propulsion of the machine.

It will be noted that the motor 14 is disposed at one side of the wheel 10, while the cutting element 6 is at the other side thereof. This arrangement balances the machine laterally and resists tendencies for the same to tip over or bear unequally on the handles 24. The resultant equilibrium relieves the operator of the necessity for care and caution to keep the machine steady, and eliminates strain on the hands and arms of the operator. Further, it will be noted that the motor 14 is mounted forward of the wheel center and the cutter element 6 rearwardly thereof. This arrangement balances the machine in a longitudinal sense and relieves the frame of undue weight in the region of one or the other end. Thus, a minimum of effort is required on the part of the operator to raise or lower the cutter element by the corresponding control of the handles 24, since no appreciable weight or resistance is contended with. In fact, the relative weight of the motor and cutter element may be apportioned with respect to the center of rotation by so spacing these units from the latter as to balance the machine longitudinally with a high degree of accuracy and thus secure a maximum state of equilibrium. Consequently, the machine is easily under the control of the operator at all times.

Further, it will be noted that the frame of the machine and its branches, such as the section 2a, the strut bars 7, the bearing plates 12 and the motor bracket 13, are units of skeleton form and therefore of extreme lightness consistent with strength. The machine is therefore easy to handle and to propel.

Since air-cooled gasoline motors are the lightest type of power plant for this class of machine, it will be seen that the high and forward mounting of the motor not only isolates it from thistles, tall weeds and grasses encountered in the travel of the machine, but also exposes the motor prominently to the front for maximum air-cooling. On the other hand, the transmission belt 17 forms a simple method for transporting the drive of the motor to a low point, where the gearing of the pulley 19, shaft 19a, pitman 20, etc., is located, this gearing being in proximity to the cutter element to form a direct and compact drive therefor. In this region, I have provided a metal-like shield 25, under the said gearing, as clearly shown in Figure 1, to protect the same from the weeds and grasses over which the machine travels, this shield being welded or otherwise suitably attached to the frame work of the machine. In this connection, it may be said that the angle bars of the hanger 9 are somewhat offset in order to conveniently locate them opposite one of the strut bars 7, and to be welded thereto for reinforcement purposes.

In conclusion, it will be evident that I have provided a machine that may be made amply strong, yet extremely light, and which may be handled, trained, steered and propelled with a minimum of effort.

I claim:—

1. A mowing machine comprising a medial traction wheel, a frame receiving the latter, a power plant carried by the frame forwardly of the wheel center, and a mowing element carried by the frame rearwardly of the same.

2. The structure of claim 1, the power plant being at one side of the wheel and the mowing element at the other side thereof.

3. The structure of claim 1, the power plant being positioned at a high level, and the mowing element being positioned at a low level.

4. The structure of claim 1, the power plant being positioned above the center of the wheel, and the mowing element being positioned close to the bottom of the wheel.

5. A mowing machine comprising a frame composed of horizontal bars, a traction wheel journaled in the frame, a bracket carried by one side of the frame and outwardly extended, a power plant supported by the bracket, an extension of the frame formed by downwardly curving the rear portions of its bars, and the mowing element connected to said extension and projecting from the other side of the frame.

6. The structure of claim 5, said extension being vertically positioned.

7. A mowing machine comprising a horizontal frame, a traction wheel journaled in the same, a power plant carried by one side of the frame, a hanger depending from the same side of frame below the power plant, a shaft journaled in the hanger at a low level, a transmission element from the power plant to the shaft, a mowing element carried by the frame and in proximity to the shaft, and a working connection between the latter and the mowing element.

8. The structure of claim 7, the hanger being at one side of the frame, and the mowing element extending from the other side of the frame.

9. A mowing machine comprising a horizontal U-frame, a traction wheel journaled in the sides of the frame, a power plant carried by one side of the frame, curved downward extensions of the free ends of the frame to form vertical sections, a mowing element carried by the latter and extending from the other side of the frame, and chord-like reenforcing bars spanning the curved portions of the frame bars.

10. The structure of claim 9, the sides of the frame being formed with outwardly facing hollows, elongated members seating in said hollows and secured to the frame sides, and extensions of said members rising to form handles for the manual control of the machine.

In testimony whereof I affix my signature.

SILAS E. RAWLS.